United States Patent [19]

Uragami et al.

[11] Patent Number: 5,362,761
[45] Date of Patent: Nov. 8, 1994

[54] PROCESS FOR FABRICATING POROUS SILICONE PRODUCT

[75] Inventors: Tadashi Uragami, Mino; Yoshiaki Tanaka, Takaishi; Masaru Ozaki, Ichihara; Tatsuya Nakamura, Nishinomiya, all of Japan

[73] Assignees: Lignyte Co., Ltd., Osaka; Dow Corning Toray Silicone Co., Ltd., Tokyo, both of Japan

[21] Appl. No.: 134,837

[22] Filed: Oct. 12, 1993

Related U.S. Application Data

[63] Continuation-in-part of Ser. No. 23,430, Feb. 3, 1993, abandoned, which is a continuation of Ser. No. 912,245, Jul. 13, 1992, abandoned.

[30] Foreign Application Priority Data

Nov. 20, 1992 [JP] Japan ................... 3-171190

[51] Int. Cl.$^5$ ................ C08J 9/26; C08J 9/28
[52] U.S. Cl. .................... 521/64; 521/61; 521/62; 521/63; 521/66; 521/72; 521/154
[58] Field of Search ............. 521/64, 61, 66, 154, 521/62, 63, 72

[56] References Cited

U.S. PATENT DOCUMENTS

| | | | |
|---|---|---|---|
| 3,031,427 | 4/1962 | Talalay | 521/66 |
| 3,236,788 | 2/1966 | Smith-Johnsen | 521/66 |
| 3,376,158 | 4/1968 | Buser | 264/41 |
| 3,756,967 | 9/1974 | Lieban et al. | 521/145 |
| 3,812,224 | 11/1974 | Smith et al. | 264/28 |
| 3,849,350 | 6/1974 | Matsko | 521/54 |
| 3,849,528 | 11/1974 | Smith et al. | 264/49 |
| 4,221,688 | 9/1980 | Johnson et al. | 528/18 |
| 4,522,753 | 6/1985 | Yannes et al. | 264/49 |
| 4,673,695 | 6/1987 | Aubert et al. | 521/64 |
| 5,128,382 | 7/1992 | Elliott, Jr. et al. | 521/64 |

FOREIGN PATENT DOCUMENTS 0097914 1/1984 European Pat. Off. .

OTHER PUBLICATIONS

World Patents Index Latest DERWENT Publicators Ltd, London, GB.; AN 89058211[08] (absract for JP-A-1.001-141 (Nippi Kollagen Kogo K.K.) 03 Jul. 1984.

*Primary Examiner*—Morton Foelak
*Attorney, Agent, or Firm*—Armstrong, Westerman, Hattori, McLeland & Naughton

[57] ABSTRACT

A process of fabricating a porous silicone product utilizing a silicone emulsion capable of forming an elastomer by removal of water therefrom. The silicone emulsion comprises a water emulsion of an organopolysiloxane, a cross-linking agent, and a curing catalyst. The process comprises the steps of freezing the silicone emulsion, and drying the frozen silicone emulsion, whereby water is sublimed therefrom and the porous silicone product is obtained. The resulting porous silicone product is best utilized as a selective permeable membrane for separation of a liquid component from a liquid solution containing two or more liquid components.

6 Claims, 2 Drawing Sheets

PROCESS FOR FABRICATING POROUS SILICONE PRODUCT

This application is a continuation-in-part of application Ser. No. 08/023,430, filed Feb. 3, 1993, now abandoned, which is a continuation of application Ser. No. 07/912,245, filed Jul. 13, 1992 and now abandoned.

BACKGROUND OF THE INVENTION

1. Field of the Invention

The present invention is directed to a process of fabricating a porous silicone product, and more particularly to a porous silicone membrane for use in membrane separation of a liquid component from a liquid solution containing two or more liquid components.

2. Description of the Prior Art

Japanese Patent Publication (KOKOKU) No. 62-49897 discloses a process of fabricating a porous silicone product. The process comprises first freezing a silicone emulsion chiefly composed of a water emulsion of organopolysiloxane into a resulting frozen body followed by defrosting the frozen body to obtain a wet and spongy elastomer. Thereafter, the resulting elastomer is dried to remove the water content to thereby obtain a porous silicone product. Since this process comprises the simple steps of freezing, defrosting and drying, the porous silicone product can be easily fabricated. However, the process is found to be only effective to fabricate a silicone product with closed or non-intercommunicating cells, and is not applicable to fabricate a silicone product with open or intercommunicating cells. This means that the silicone product fabricated by the process disclosed in the above publication is effective as a gasket or a heat insulation member which requires closed cells, but cannot be utilized as a membrane or the like which necessitates open cells, for example, as a selective permeable membrane for separation of a liquid component from a liquid solution containing two or more liquid components.

SUMMARY OF THE INVENTION

The present invention has been accomplished to eliminate the above problem, and has as a primary object to provide a unique method of fabricating a porous silicone product with open cells. The process in accordance with the present invention comprises the steps of freezing a silicone emulsion comprising a water emulsion of an organopolysiloxane, a cross-linking agent and a curing catalyst wherein the silicone emulsion is capable of forming an elastomer by removal of water therefrom, and drying the frozen silicone emulsion, whereby water is sublimed therefrom and the porous silicone product is obtained.

The silicone emulsion, which is capable of forming an elastomer by removal of water therefrom, preferably comprises:
a) a substantially straight chain organopolysiloxane having at least two silanol groups per one molecule;
b) a cross-linking agent selected from the group consisting of colloidal silica, silicate of alkali metal, hydrolyzable silane, and partially hydrolyzed condensate of hydrolyzable silane;
c) a curing catalyst;
d) an emulsifier; and
e) water.

DETAILED DESCRIPTION OF THE INVENTION

Figure 1:
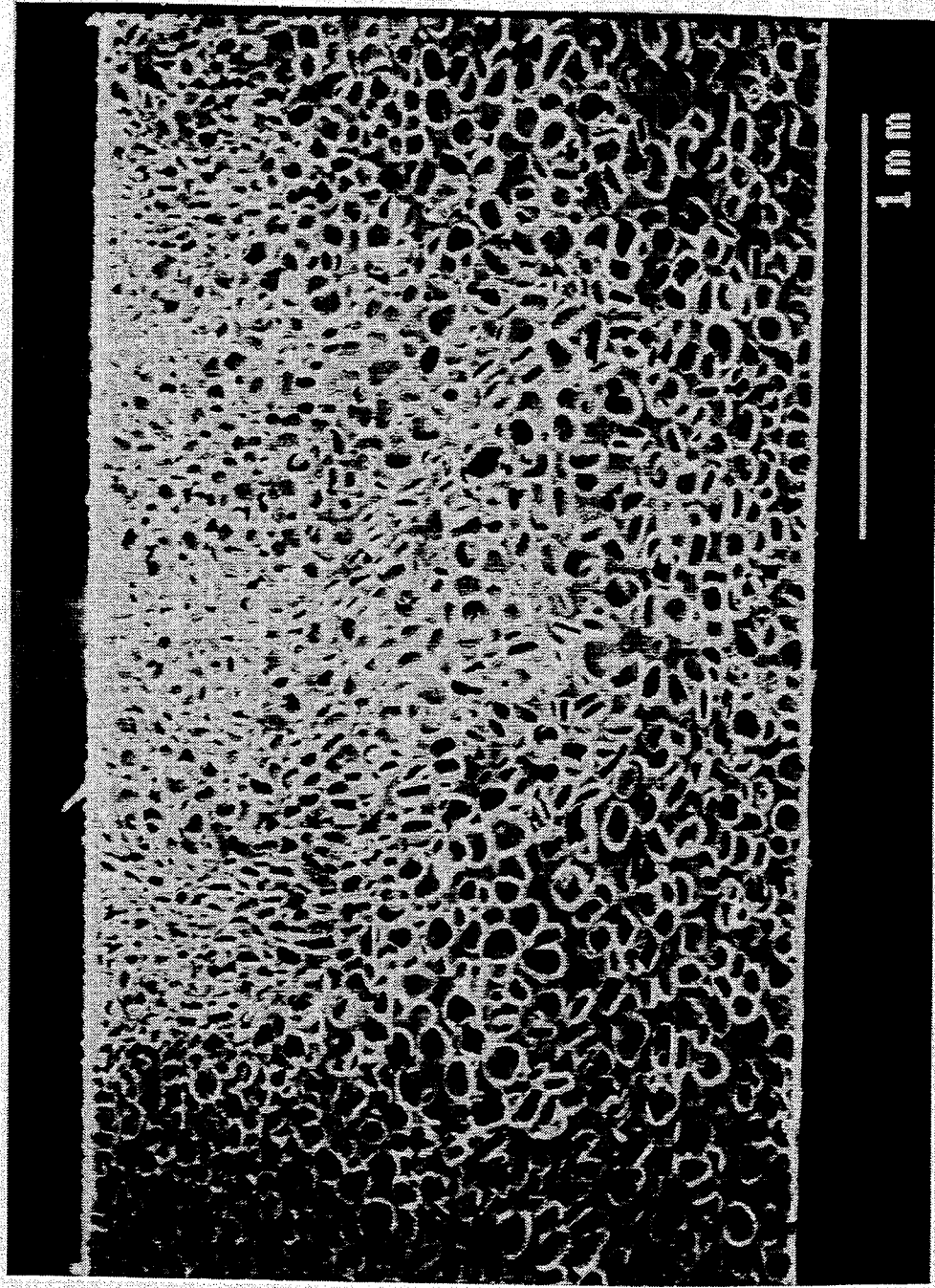
FIG. 1 is a photomicrograph showing a cross section of a porous silicone membrane obtained in Example 1 at 50 times magnification.

The present invention will be discussed in detail. The silicone emulsion, which is capable of forming an elastomer by removal of water therefrom, may include the one disclosed in the above publication or like emulsions known in the art. For example, the following known emulsions may be utilized in the present invention. A composition of an emulsion of diorganopolysiloxane with silanol groups, colloidal silica and organic tin catalyst, as disclosed in Japanese Early Patent Publication (KOKAI) No. 56-16553. A composition of an emulsion of diorganopolysiloxane with vinyl groups, an emulsion of organohydrodienepolysiloxane, and platinum catalyst, as disclosed in Japanese Early Patent Publication (KOKAI) No. 56-36546. A composition of a polymerization emulsion of cyclodiorganosiloxane and functional organic alkoxysilane as disclosed in Japanese Patent Publication (KOKOKU) No. 56-38609. A composition of an emulsion of diorganopolysiloxane with silanol groups, hydrolyzable silane and curing catalyst, as disclosed in Japanese Patent Publication (KOKOKU) No. 59-36677.

The silicone emulsion contains the following components in order to expedite curing by removal of water at room temperatures into a resulting elastomer:
a) a substantially straight chain organopolysiloxane having at least two silanol groups per one molecule;
b) a cross-linking agent selected from the group consisting of colloidal silica, silicate of alkali metal, hydrolyzable silane, and partially hydrolyzed condensate of hydrolyzable silane;
c) a curing catalyst;
d) an emulsifier; and
e) water.

Organo Polysiloxane

An organopolysiloxane as defined in the above (a) is a polymer having at least two silanol groups per one molecule and is cross-linked by the cross-linking agent (b) into a rubber elastic body. Although the location of the silanol groups is not limited, the silanol groups are preferred to be located at the terminal chain ends of the polymer. Organic groups bonded to the silicon atoms of the organopolysiloxane are substituted or non-substituted monovalent hydrocarbon groups which include: alkyl group such as methyl, ethyl, propyl and butyl; alkenyl group such as vinyl and allyl; aryl group such as phenyl; aralkyl group such as benzyl; alkylaryl group such as styryl, tolyl; cycloalkyl group such as cyclohexyl, cyclopentyl; or any one of the above groups in which hydrogen atoms are partially or entirely substituted by a halogen (fluorine, chlorine or bromine), for example, 3,3,3-trifluoropropyl. As the monovalent hydrocarbon groups, it is common to use methyl, vinyl or phenyl, among all, methyl. The monovalent hydrocarbon groups bonded to the silicon atoms may be identical, or a combination of different monovalent hydrocarbon groups may be used. The organopolysiloxane is of substantially straight chain structure which may include to some extent branch chains. Although the organopolysiloxane is not limited to a particular molecular weight, it is preferred that the molecular weight be 5,000 or more. Reasonable tensile strength and elongation are obtained at a molecular weight of 30,000 or more. And the most preferable tensile strength and elongation are obtained at a molecular weight of 50,000 or more. However, the molecular weight preferably is 1,000,000 or less to effect emulsification successfully.

Such organopolysiloxane may include dimethylpolysiloxane, methylphenylpolysiloxane, copolymer of dimethylsiloxane and methylphenylsiloxane, methylvinylpolysiloxane, and copolymer of dimethyl siloxane and methylvinylsiloxane of which the terminal ends are blocked by silanol groups. The above organopolysiloxane may be synthesized for example, by ring-opening polymerization of cyclodiorganosiloxane, by hydrolysis condensation of straight or branch chain organopolysiloxane having hydrolyzable alkoxy or acyloxy groups, or by hydrolysis of one or more diorganodihalogenosilanes.

One or more of the above described organopolysiloxanes may be used in preparing the emulsion.

Cross-Linking Agent

The cross-linking agent is a cross-linking agent for the above mentioned organopolysiloxane and may include colloidal silica, silicate of alkali metal, hydrolyzable silane, and partially hydrolyzed condensate of hydrolyzable silane. The colloidal silica may be fumed colloidal silica, precipitation colloidal silica, or colloidal silica stabilized with Na, $NH_3$, or Al ions and having a particle size of 0.0001 to 0.1 $\mu$m. The amount of the colloidal silica is 1 to 150, more preferably 1 to 70, parts by weight for 100 parts by weight of the above organopolysiloxane. The silicate of alkali metal is preferred to be water soluble and is used as an aqueous solution thereof. The silicate of alkali metal includes lithium silicate, sodium silicate, potassium silicate, and rubidium silicate. The amount of silicate of alkali metal preferably ranges from 0.3 to 30 parts by weight, more preferably, from 0.3 to 20 parts by weight for 100 parts by weight of organopolysiloxane. The hydrolyzable silane and partially hydrolyzed condensate of hydrolyzable silane are required to have in one molecule thereof at least three hydrolyzable groups bonded to the silicon atoms because an elastomer is not obtained with two or less hydrolyzable groups. The hydrolyzable group includes alkoxy group such as methoxy, ethoxy, and butoxy; acyloxy group such as acetoxy; acetoamide group; substituted or non-substituted acetoamide group such as N-methylacetoamido; alkenyloxy group such as propenoxy; substituted amino group such as N,N-diethylamino; and ketoxime group such as methylethylketoxime. Examples of the hydrolyzable group are methyltriethoxysilane, vinyltrimethoxysilane, normal propylorthosilicate, ethylpolysilicate, propylpolysilicate, methyltri(propanoxy)silane, methyltri(methylethylketoxime)silane. A combination of two or more such hydrolyzable groups may be used. The amount of the hydrolyzable group ranges preferably from 1 to 150 parts by weight for 100 parts by weight of organopolysiloxane.

One or more of the above described cross-linking agents may be used in preparing the emulsion.

Curing Catalyst

The above curing catalyst is employed to promote the cross-linking of organopolysiloxane by the cross-linking agent, and includes metal salt of organic acid such as dibutyl-tin-dilaurate, dibutyl-tin-diacetate, tin octanoate, dibutyl-tin-dioctanoate, tin laurate, ferric stannooctanoate, lead octanoate, lead laurate, and zinc octanoate; titanic acid ester such as tetrabutyltitanate, tetrapropyltitanate, dibutoxytitan-bis(ethylacetoacetate); and amine compound or hydrochlorate of n-hexylamine and guanidine. The curing catalyst is preferably made in advance into an emulsion with the aid of an emulsifier and water by a conventional method. The amount of the curing agent ranges preferably from 0.01 to 1.5, more preferably, from 0.05 to 1 parts by weight for 100 parts by weight of organopolysiloxane.

One or more of the above described curing catalysts may be used in preparing the emulsion.

Emulsifier

The above emulsifier for emulsifying the organopolysiloxane may be anionic, non-ionic or cationic emulsifier. The anionic emulsifier includes, for example, salts of higher fatty acids, sulfuric acid ester salts of higher alcohols, ester acids, alkylbenzenesulfonate, alkylnaphthalenesulfonate, and alkylsulfonate, polyethyleneglycolsulfate. The non-ionic emulsifier includes, for example, polyoxyethylenealkylphenylether, sorbitan fatty acid ester, polyoxyethylene sorbitan fatty acid ester, polyoxyalkylene fatty acid ester, polyoxyethylene polyoxypropylene, and monoglyceride fatty acid. The cationic emulsifier includes, for example, aliphatic amine salts, quaternary ammonium salts and alkylpyridinium salts. One or more of these emulsifiers may be utilized for preparation of the emulsion. The amount of the emulsifier ranges preferably from 2 to 30 parts by weight for 100 parts by weight of organopolysiloxane.

Water

Water is utilized in sufficient amount to prepare an aqueous emulsion of organo-polysiloxane with the cross-linking agent, the curing catalyst and the emulsifier. Therefore, there is no limitation on the amount of water.

A silicone emulsion which forms an elastomer by removal of water therefrom can be prepared from the aqueous emulsion of the organopolysiloxane, the cross-linking agent, and curing catalyst in accordance with one of the known processes. For example, the aqueous emulsion can be made by utilizing an emulsifying device such as a homomixer, homogenizer, or colloid mill to emulsify dimethylpolysiloxane having silanol groups at its terminal ends into water with the emulsifier, followed by adding and mixing the cross-linking agent such as colloidal silica and the curing catalyst. Alternately, the silicone emulsion is prepared by emulsifying cyclodiorganosiloxane, for example, octamethylcyclotetrasiloxane into water with the emulsifier, adding an open-ring polymerization catalyst to effect polymerization under the application of heat for preparing dimethylpolysiloxane of which the terminal ends are blocked with silanol groups, followed by adding and mixing the cross-linking agent, for example, colloidal silica and the curing catalyst.

For excellent shelf life stability, it is preferred to firstly prepare a base emulsion which consists essentially of: 100 parts by weight of an organopolysiloxane containing silanol groups; 1 to 150 parts by weight of colloidal silica, 0.3 to 30 parts by weight of silicate of metal alkali, or 1 to 150 parts by weight of hydrolyzable silane or partially hydrolyzed condensate thereof as the cross-linking agent; 2 to 30 parts by weight of the emulsifier; and water. The resulting base emulsion is adjusted to have a 9 to 12 pH by a suitable pH adjustor to obtain an aqueous silicone emulsion of excellent shelf life stability. The pH adjustor includes amines such as dimethylamine and ethyleneamine, and hydroxides of alkali metal such as sodium hydroxide and potassium hydroxide. Preferably, organic amines are selected as the pH adjustor. Such organic amines include, in addition to the above, mono-ethanolamine, tri-ethanolamine, morpholine and 2-amino-2-methyl-1-propanol. After the pH adjustment, the emulsion is aged for a predetermined time period at a constant temperature. The aging temperature is selected so as not to destroy the emulsion and is preferably from 10° to 95° C., and more preferably from 15 to 50° C. The aging time period is selected in accordance with the aging temperature and is preferably, for example, a week or more at the aging temperature of 25° C. and 4 days or more at 40° C. The thus obtained emulsion of organopolysiloxane exhibits excellent shelf life stability at room temperatures, and is easy to cure into an elastomer at room temperatures by addition by a curing catalyst and removal of water therefrom.

When shelf life stability at room temperatures is not required, the base emulsion may have the pH of 9 or less. The organopolysiloxane emulsion in accordance with the present invention may additionally include a thickening agent, filler, pigment, dye, heat-resisting agent, antiseptic, penetrant such as aqueous ammonia in a suitable amount. When the emulsion is prepared to include the cross-linking agent other than the colloidal silica, the resulting organopolysiloxane emulsion shows less viscosity and is difficult to be formed into a thick elastomer. To avoid this problem, it is preferred to incorporate in addition a filler such as quartz powder, calcium carbonate, magnesium oxide, zinc dioxide, tinium dioxide and carbon black. In order to give an increased tension strength as well as increased elongation to the resulting elastomer, the filler is preferably provided in the form of a colloid. The thickening agent includes carboxymethyl-cellulose, methylcellulose, hydroxyethylcellulose, polyvinyl alcohol, and polyacrylic acid.

Prior to fabricating a porous silicone product with open cells from the thus obtained silicone emulsion, it is required to remove bubbles out of the emulsion by, for example, the vacuum defoaming process. Without defoaming, the bubbles are likely to be left entrapped in the porous silicone product, resulting in failure to obtain a silicone product with uniform cell. Especially when the silicone product is made into a membrane, the bubbles are the cause of large holes in the membrane. With this result, when the membrane is utilized as a selective permeable membrane for separation of a liquid component from a solution containing two or more liquid components, good separation efficiency will not expected due to the presence of the large holes in the membrane.

After defoaming, the silicone emulsion is frozen in a freezer. For fabrication of the silicone membrane, the emulsion may be spread over a flat plate, or poured onto the flat bottom of a container to form a layer of uniform thickness, prior to freezing. Also prior to freezing, it is preferred to effect preliminary cooling of the emulsion down to such a minimum possible temperature as to not freeze the emulsion and to keep cooling over a predetermined period of time. For example, the cooling temperature is preferably set to a temperature which is higher only by 2° to 3° C. than the freezing point of the silicone emulsion. The cooling is preferably kept continued for a time period of 1 to 5 hours. For example, the emulsion having a freezing point of −10° C. is cooled in a cooled vessel maintained at a temperature of −7° to −8° C. for approximately 3 hours. Freezing of the emulsion without such preliminary cooling will cause stratification between water and the solid content within the emulsion, thereby making it difficult to obtain a silicone product with uniform cell. Also with this direct freezing, the water crystal, i.e. ice, grows into a large size, which makes it difficult to obtain a porous silicone product with fine and dense cells.

After the preliminary cooling, the silicone emulsion is frozen in a freezer. The freezing temperature may be as low as possible, and is selected to be lower by 5° C. or more, preferably 10° C. or more, than the freezing point of the emulsion. In this freezing step, the water contained in the silicone emulsion is frozen out.

Thereafter, the ice contained in the frozen silicone emulsion is sublimed without being defrosted in order to remove the water content from the frozen silicone emulsion. Such drying is performed in vacuum with the frozen silicone emulsion placed in a vacuum chamber of a freeze-drying device while recovering the water content in a cold-trap manner. The vacuum drying is preferably carried out within the vacuum chamber under the vacuum pressure of 1 Torr or less for a time period of at least 4 hours. As a result of subliming the water content from the frozen silicone emulsion, the organopolysiloxane is allowed to react with the cross-linking agent, forming a three-dimensional structure resulting in a silicone elastomer, and corresponding voids are left within the silicone elastomer such that the resulting elastomer has a number of open or intercommunicating cells. This is the very opposite of the case where a silicone product with closed or non-intercommunicating cells is obtained as a consequence of defrosting the frozen silicone emulsion prior to the drying. Accordingly, drying should be effected as soon as possible so as to avoid defrosting the frozen silicone emulsion. No substantial heating is necessary during the drying process. Particularly, any heating should be avoided at the initial stage of the drying. However, it may be advantageous to apply heat at the final stage of the drying for promoting and completing the drying.

The following Examples are further illustrative of this invention. All parts therein are by weight.

EXAMPLE 1

100 parts of dimethylpolysiloxane having 30 repeating siloxane units and having its terminal ends blocked with silanol groups were mixed with 2 parts of sodium lauryl sulfate and 70 parts of water. The resulting mixture was passed twice through a homogenizer under a pressure of 150 kg/cm$^2$. Then, 1 part of dodecylbenzenesulfonate was added as a polymerization initiator to the mixture followed by being subjected to emulsion polymerization at a room temperature for 16 hours, after which a solution of sodium hydroxide is utilized to adjust the pH of the mixture to 7, thereby obtaining an emulsion A containing dimethylpolysiloxane having a molecular weight of 200,000 and having its terminal ends blocked with the silanol groups. 40 parts of dioctyl-tin-dilaurate was mixed with 10 parts of sodium lauryl sulfate and 40 parts of water, followed by being passed twice through the homogenizer to obtain an emulsion B containing the curing catalyst. 100 parts of emulsion A was mixed with 1.5 parts of emulsion B and 25 parts of water dispersion of colloidal silica (having a solid content of 30 wt %) as the cross-linking agent. Diethylamine was added for adjusting the pH of the resulting mixture to 11, after which the mixture was aged at a room temperature of 25° C. for 2 weeks to obtain a silanol emulsion.

Figure 2:
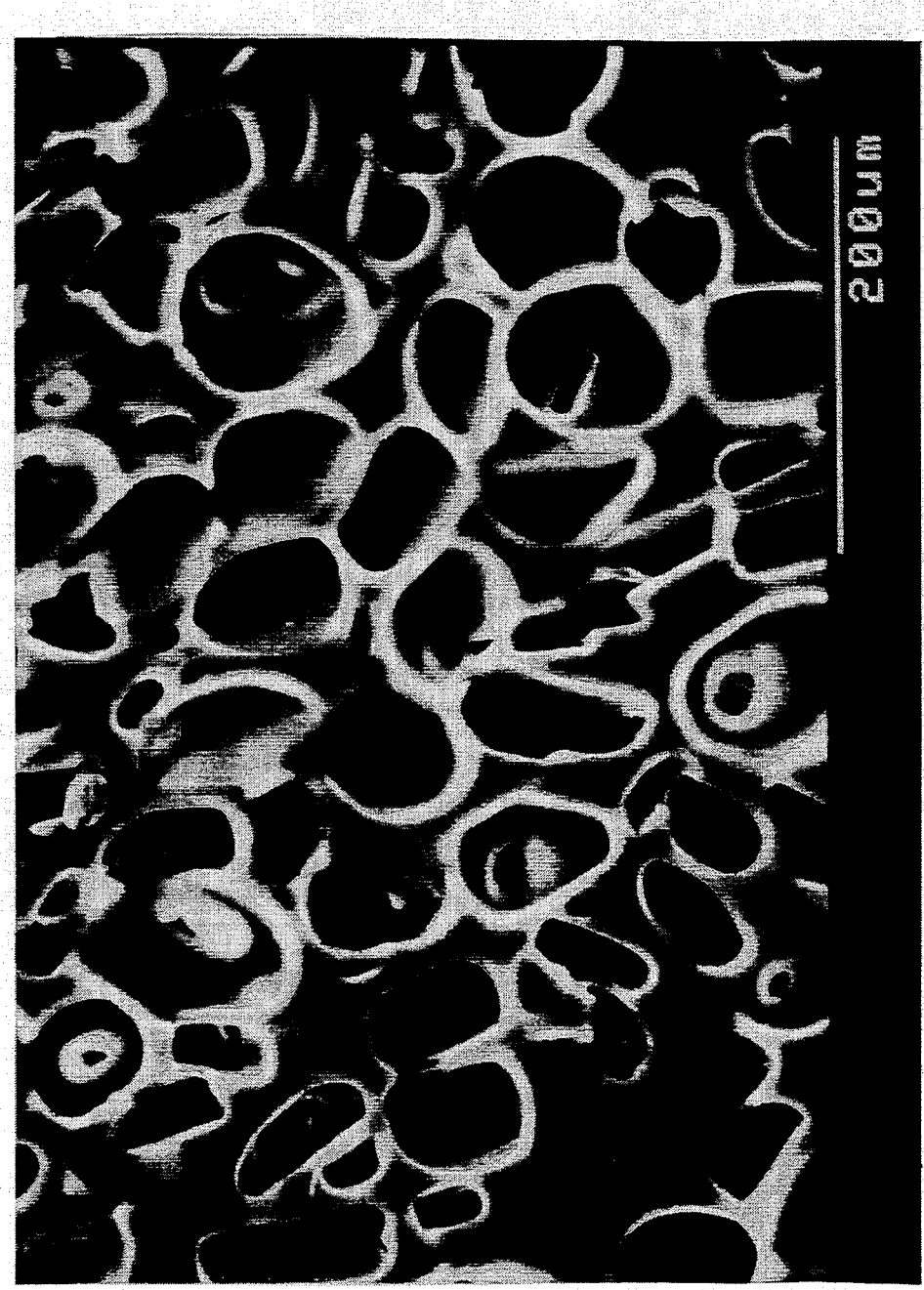
FIG. 2 is an electron photomicrograph showing the cross section of the above silicone membrane at 250 times magnification.

Then, the silanol emulsion was kept under a decompressed pressure of 50 Torr for 20 minutes for defoaming of the emulsion, after which the emulsion was poured onto a Petri dish having 95 mm diameter and 15 mm depth to form a specimen 2 mm thick. The Petri dish was sealed at its top opening by aluminum foil to effect preliminarily cooling of the specimen at a temperature of −6° C. for 3 hours. Next, the specimen was placed into a freezer maintained at a temperature of −25° C. and kept for 15 hours to be frozen therein. After removal from the freezer, the specimen was placed in a vacuum chamber of a freeze-dryer available as "VD-80" from "Taitech Corp." to be dried without being defrosted under a vacuum pressure of 0.05 Torr at a cold trap temperature of −80° C. for 6 hours, thereby obtaining a porous silicone membrane 2 mm thick. The resulting silicone elastomer membrane was found to have a number of open cells which have an average diameter of 70 $\mu$m and intercommunicated through-voids of 3 $\mu$m in average diameter. FIGS. 1 and 2 show cross-sections of the thus obtained silicone elastomer membrane in photomicrographs.

EXAMPLE 2

100 parts of emulsion A prepared in Example 1 was mixed with 1.5 parts of emulsion B prepared in Example 1, and 25 parts of water dispersion solution of colloidal silica (having a solid content of 30 wt %) as the cross-linking agent to give a dimethylpolysiloxane emulsion having the pH of 5.5. Thereafter, the silicone emulsion was frozen and dried in the same manner as in Example 1 to give a 2 mm thick porous silicone elastomer membrane, except that the emulsion was not aged prior to the freeze-drying. The resulting silicone elastomer membrane was found to have a number of open cells having an average diameter of 30 $\mu$m and intercommunicated through-voids of 1.5 $\mu$m in average diameter.

EXAMPLE 3

100 parts of emulsion A prepared in Example 1 was mixed with 1.5 parts of emulsion B prepared in Example 1, and 3 parts of sodium silicate as a curing catalyst. After being added with diethylamine for pH adjustment to 10, the mixture was aged at a room temperature of 25° C. for 4 weeks to prepare a silicone emulsion. The thus obtained emulsion was then frozen and dried in the same manner as in Example 1 to give a 2 mm thick porous silicone elastomer membrane, except that the emulsion was not aged prior to the freeze-drying. The resulting silicone elastomer membrane was found to have a number of open cells having an average diameter of 40 $\mu$m and intercommunicated through-voids of 1.5 $\mu$m in average diameter.

EXAMPLE 4

100 parts of emulsion A prepared in Example 1 was mixed with 1 part of vinyltrimethoxysilane as a cross-liking agent and 0.1 part of dioctyl-tin-dilaurate as a curing catalyst followed by being stirred into a homogeneous silica emulsion. The thus obtained emulsion was then frozen and dried in the same manner as in Example 1 to give a 2 mm thick porous silicone elastomer membrane, except that the emulsion was not aged prior to the freeze-drying. The resulting silicone elastomer membrane was found to have a number of open cells having an average diameter of 20 $\mu$m and intercommunicated through-voids of 1 $\mu$m in average diameter.

COMPARATIVE EXAMPLE 1

The silicone emulsion prepared in Example 1 was defoamed and poured onto a Petri dish to form a specimen 2 mm thick. The specimen was placed in the freezer maintained at a temperature of −20° C. and kept for 16 hours to be frozen therein. After removing out of the freezer, the specimen was left standing at a room temperature of 25° C. for 6 hours so as to be defrosted into a 2 mm thick silicone membrane saturated with water. Next, the thus defrosted silicone membrane was dried within an oven at 70° C. for 20 hours to obtain a 1.1 mm thick porous silicone elastomer membrane. The resulting silicone elastomer membrane was found to have a number of minute closed cells having an average diameter of 70 $\mu$m and also found to have a skin layer on its surface.

COMPARATIVE EXAMPLE 2

The silicone emulsion prepared in Example 2 was treated in the same manner as in Comparative Example 1 to give a 1 mm thick porous silicone elastomer membrane. The resulting silicone elastomer membrane was found to have a number of minute closed cells having an average diameter of 30 $\mu$m and also found to have a skin layer on its surface.

COMPARATIVE EXAMPLE 3

The silicone emulsion prepared in Example 3 was treated in the same manner as in Comparative Example 1 to give a 1 mm thick porous silicone elastomer membrane. The resulting silicone elastomer membrane was found to have a number of minute closed cells having an average diameter of 40 $\mu$m and also found to have a skin layer on its surface.

COMPARATIVE EXAMPLE 4

The silicone emulsion prepared in Example 4 was treated in the same manner as in Comparative Example 1 to give a 1.1 mm thick porous silicone elastomer membrane. The resulting silicone elastomer membrane was found to have a number of minute closed cells having an average diameter of 20 $\mu$m and also found to have a skin layer on its surface.

What is claimed is:

1. A process for fabricating a porous silicone product by utilizing silicone emulsion capable of forming an elastomer by removal of water therefrom, said silicone emulsion comprising a water emulsion of an organopolysiloxane, a cross-linking agent, and a curing catalyst, said process comprising the steps of:
   freezing said silicone emulsion; and drying said frozen silicone emulsion, whereby water is sublimed therefrom and said porous silicone product is obtained.

2. A process as set forth in claim 1, wherein said silicone emulsion comprises:
   a) a substantially straight chain organopolysiloxane having at least two silanol groups per one molecule;
   b) a cross-linking agent selected from the group consisting of colloidal silica, silicate of alkali metal, hydrolyzable silane, and partially hydrolyzed condensate of hydrolyzable silane;
   c) a curing catalyst;
   d) an emulsifier; and
   e) water.

3. A process as set forth in claim 1, wherein said freezing step is carried out after first cooling said silicone emulsion to such a temperature so as not to freeze said silicone emulsion.

4. A process as set forth in claim 2, wherein said freezing step is carried out after first cooling said silicone emulsion to such a temperature so as not to freeze said silicone emulsion.

5. A process as set forth in claim 1, wherein said porous silicone product is elastomeric.

6. A process as set forth in claim 1, wherein said porous silicone product has open cells.

* * * * *

UNITED STATES PATENT AND TRADEMARK OFFICE
CERTIFICATE OF CORRECTION

PATENT NO. :   5,362,761
DATED      :   November 8, 1994
INVENTOR(S):   URAGAMI et al.

It is certified that error appears in the above-identified patent and that said Letters Patent is hereby corrected as shown below:

On the cover page, Item [30], "November 20, 1992" should read --July 11, 1991--.

Signed and Sealed this

Seventh Day of March, 1995

Attest:

BRUCE LEHMAN

Attesting Officer            Commissioner of Patents and Trademarks